United States Patent [19]

Müller et al.

[11] Patent Number: 5,307,704
[45] Date of Patent: May 3, 1994

[54] ADJUSTMENT DRIVE

[75] Inventors: Karlheinz Müller, Würzburg; Peter Michel, Kleinrinderfeld, both of Fed. Rep. of Germany

[73] Assignee: Siemens Aktiengesellschaft, Munich, Fed. Rep. of Germany

[21] Appl. No.: 981,347

[22] Filed: Nov. 25, 1992

[30] Foreign Application Priority Data

Nov. 27, 1991 [EP] European Pat. Off. ........ 91120253.9

[51] Int. Cl.⁵ ........................ F16H 1/16; F16H 55/14; F16D 3/70
[52] U.S. Cl. ........................ 74/411; 74/425; 464/73; 464/92
[58] Field of Search ............. 74/411, 425, 89.14; 464/73, 92, 93, 149, 150, 152, 155, 180

[56] References Cited

U.S. PATENT DOCUMENTS

| | | | |
|---|---|---|---|
| 3,455,174 | 7/1969 | Pickels | 74/89.14 |
| 3,789,690 | 2/1974 | Droske | 74/411 |
| 4,367,660 | 1/1983 | Becker et al. | 74/411 X |
| 4,748,865 | 6/1988 | Umezawa et al. | 74/411 |
| 4,899,608 | 2/1990 | Knappe et al. | 74/411 |
| 5,178,026 | 1/1993 | Matsumoto | 74/411 |

FOREIGN PATENT DOCUMENTS

| | | |
|---|---|---|
| 3434093 | 3/1986 | Fed. Rep. of Germany . |
| 3611568 | 3/1989 | Fed. Rep. of Germany . |
| 8903714 | 3/1990 | Fed. Rep. of Germany . |
| 1051336 | 1/1954 | France . |
| 2444778 | 7/1980 | France . |
| 2532983 | 3/1984 | France . |

*Primary Examiner*—Allan D. Herrmann
*Attorney, Agent, or Firm*—Kenyon & Kenyon

[57] ABSTRACT

To simplify the design and assembly of an adjustment drive with a gear wheel mounted to rotate in a gear housing with a gear housing lid and with a driver provided with a power take-off element (e.g., a pinion) being in a drive connection with it on the output side, directly or indirectly, present invention provides that the driver is simultaneously structured as a power take-off shaft and is mounted to rotate with at least one bearing region in the gear housing or in the gear housing lid, respectively. In a further embodiment, the gear wheel is a one-piece component of the driver and is preferably placed into a drive connection with it via spring web type spokes in the form of tangential stop damping.

26 Claims, 4 Drawing Sheets

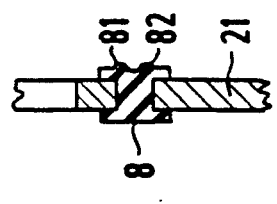
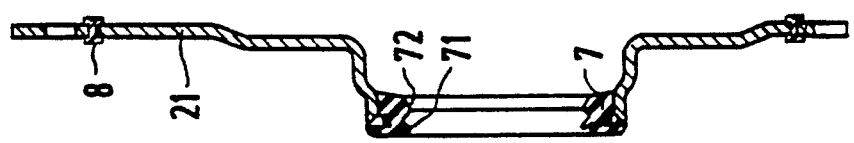
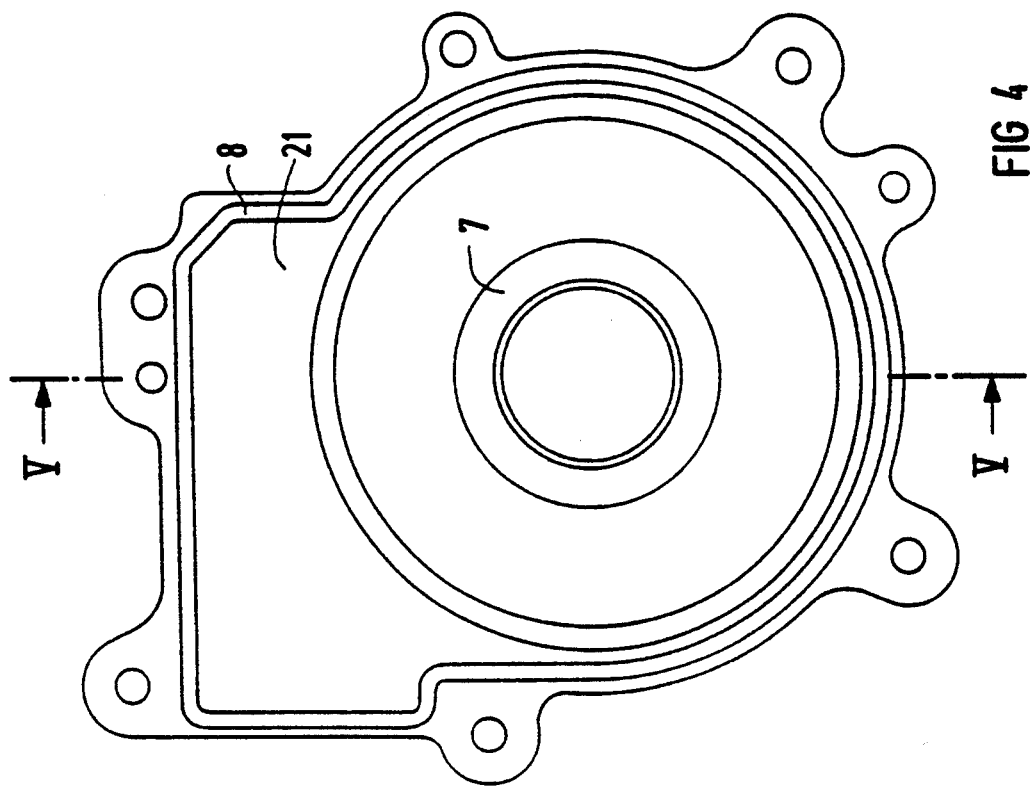

ADJUSTMENT DRIVE

BACKGROUND OF THE INVENTION

The present invention relates to an adjustment drive, and in particular, to a setting drive in a motor vehicle.

In an adjustment drive for a motor vehicle window raising mechanism described in DE-U-89 03 714.6, a gear wheel 3 and a driver 4 provided with an outside pinion 5 on the driver's power take-off side are rotatably mounted on an axially projecting axle bolt. This axle bolt is molded in one piece to the bottom of the gear housing and includes an axial shaft collar projecting out of the gear housing lid to the outside. The driver is sealed both radially outward relative to the gear housing lid, and radially inward relative to the axle bolt, by a dynamic seal 6. The dynamic seal 6 is a discrete O-ring held with a positive lock.

An adjustment drive, particularly a seat adjustment drive in a motor vehicle, is described in DE-C2-36 11 568. In that adjustment drive, a driver is connected in one piece with the worm gear shaft as a solid part and is axially mounted on each of its sides via separate bearing holders in housing walls of the gear housing. To couple on a power take-off pinion (i.e., a pinion which provides power to external elements), the pinion is inserted, as a separate component with outside gear teeth, into corresponding inner gear teeth on the circumference of an axial bore through the driver.

The present invention provides an adjustment drive requiring significantly reduced design and assembly times while still guaranteeing a complete moisture proof seal of the gear housing.

SUMMARY OF THE INVENTION

The design and assembly effort for such an adjustment drive can be significantly reduced by providing an adjustment drive including a gear housing, a gear housing lid, a gear wheel, a driver, and a damping element. The gear housing lid is adapted to close off said gear housing. The gear wheel is rotatably accommodated in the gear housing and includes a bearing sleeve. The driver includes a power take-off element (i.e., an element which provides power to external elements) on its output side, is simultaneously structured as a drive shaft, and forms a drive connection between the gear wheel and the power take-off element. The damping element is at least tangentially elastic and is provided between the gear wheel and the driver to provide a tangential stop damping. The gear wheel and the driver are formed as separate components and placed in reciprocal rotational drive, but may be integrally formed as well. The driver is rotatably mounted directly in the gear housing with a first bearing region and indirectly in the gear housing lid via the concentric bearing sleeve of the gear wheel with a second bearing region. In an alternate embodiment, the design and assembly effort for such an adjustment drive can be significantly reduced by providing an adjustment drive including a gear housing, a gear housing lid, a gear wheel, a driver, and spring web spokes. The gear housing lid is adapted to close off the gear housing. The gear wheel is rotatably accommodated in the gear housing. The driver is structured as a drive shaft, includes a power take-off element at its output side, and forms a drive connection between the power take-off element and the gear wheel. The spring web type spokes connect, in one piece, the gear wheel and the driver. The gear wheel and the driver are placed in reciprocal rotational drive with tangential stop damping. The driver is rotatably mounted directly in the gear housing with a first bearing region and directly in the gear housing lid with a second bearing region. Since the driver performs the bearing functions itself, as a rotating part, at least partially also directly relative to the gear housing or gear housing lid, in the adjustment drive, separate axles and, if applicable, bearings for rotational mounting of the additional drive or power take-off parts to be held by the axle and a dynamic seal between the driver and an axle bolt molded on in the gear housing can be eliminated.

The design and assembly effort can be even further reduced when the gear wheel is a one-piece component of the driver. When tangential stop damping between the gear wheel and the driver does not have to be eliminated, if, according to a development of the invention, the driver forms a drive connection with the gear wheel in the sense of tangential stop damping, via spring web type spokes.

BRIEF DESCRIPTION OF THE DRAWINGS

FIG. 4 illustrates an axial end view of the gear housing lid with a first and second sealing edge scorched (i.e., pre-vulcanized) onto it.

FIG. 5 is the embodiment of FIG. 4 in cross-section along the line V—V.

FIG. 6 is an enlarged view of the second sealing edge shown in FIG. 5.

DETAILED DESCRIPTION

Figure 1:
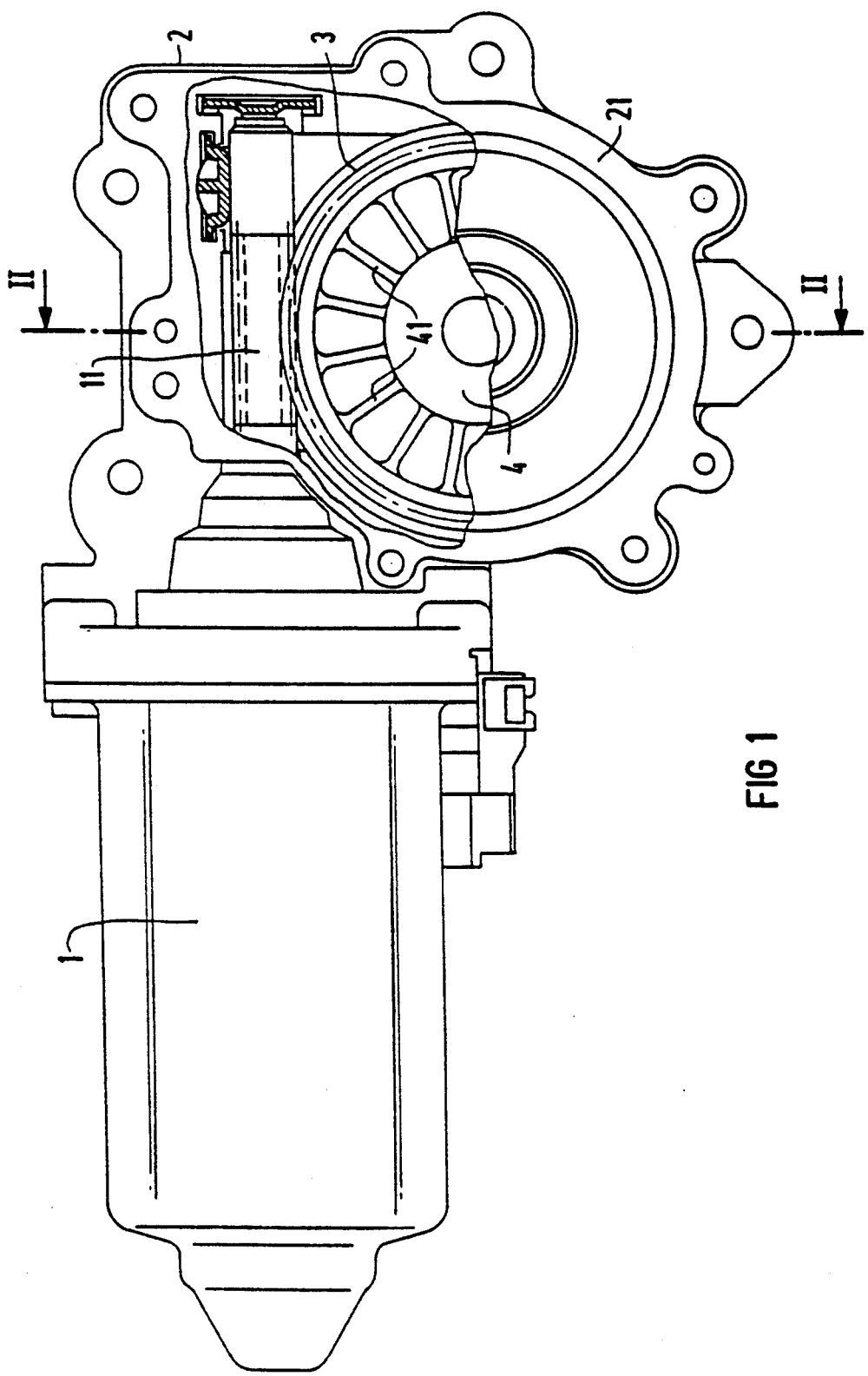
FIG. 1 is an axial, partial cut away view of a motor vehicle window lifting mechanism drive or motor vehicle sun roof drive, with an electric commutator motor which is connected, via flanges, to a gear mechanism in accordance with an embodiment of the present invention.

FIG. 1 is an axial, partial cut-away view of the basic structure of an electric motor adjustment drive for a motor vehicle, which, for example, can be used as a window raising mechanism drive or a sun roof drive in a motor vehicle. At one side of the commutator motor (indicated only schematically with its motor housing 1) a gear housing 2 is connected (e.g., via flanges). The rotor shaft 11 of the commutator motor projects into the gear housing 2. The rotor shaft 11 is formed as a worm gear which engages a gear wheel 3 which is rotatably mounted in the gear housing 2.

Figure 2:
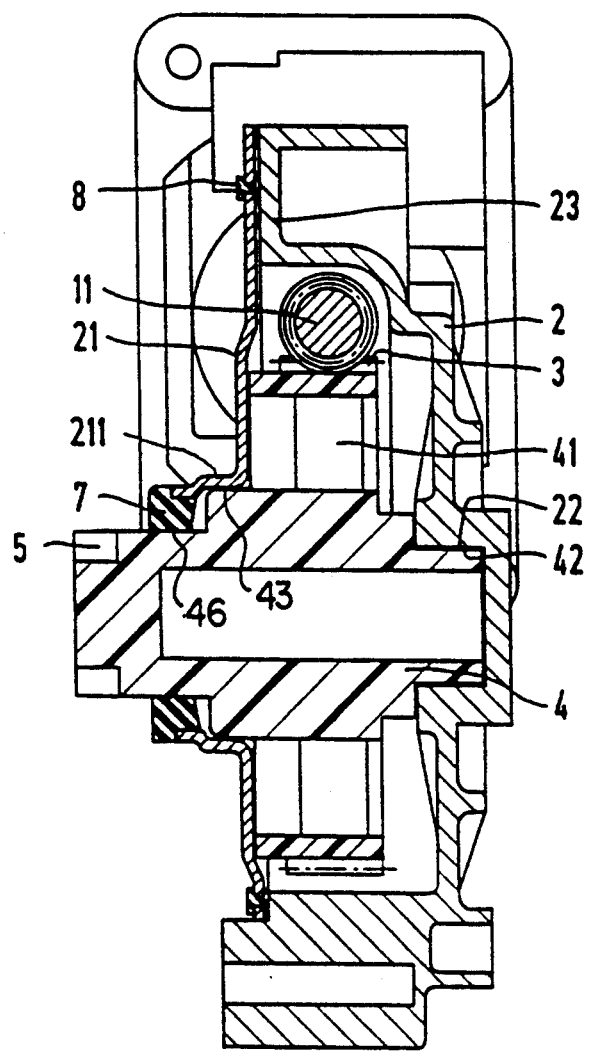
FIG. 2 illustrates the drive of FIG. 1 in cross-section along the line II—II.

As shown in combination with the cross-sectional representation pursuant to FIG. 2, the radial outside gear crown of the gear wheel 3 is a one-piece injection molded part. This one-piece part also includes spring web type spokes 41 and a driver 4. A first side of the driver 4 is directly rotatably mounted radially within a corresponding bearing holder 211 of a gear housing lid 21. The first side of the driver 4 projects through a center opening of the gear housing lid 21 and includes a pinion 5 as the outermost drive element. The pinion 5 couples onto an activation element which actuates a motor vehicle window or a motor vehicle sun roof. As with the spring web type spokes 41, the pinion 5 is also a one-piece component of the driver 4. A second side of the driver 4 is directly rotatably mounted in a portion of the gear housing 2 with a second bearing region 43. In a preferred embodiment, the driver 4 consists of a material which performs bearing functions well, and in particular, the driver 4 consists of a corresponding plastic (e.g., a POM plastic, such as polyoxymethylene or ployacetal) or a sintered material, saturated with oil. A region 46 of the driver 4 provides a surface contacting a first sealing edge 7 thereby forming a dynamic seal. The first sealing edge 7 is described in more detail below.

Instead of the one-piece connection between the gear wheel 3 and the driver 4 by means of the spring web type spokes 41, a drive connection can also be provided, within the scope of the present invention, such that radial drive webs of one of the two elements reach tangentially overlapping drive forks of the other element, where either the drive webs and/or the drive forks can be structured elastically in the form of tangential stop damping.

Figure 3:
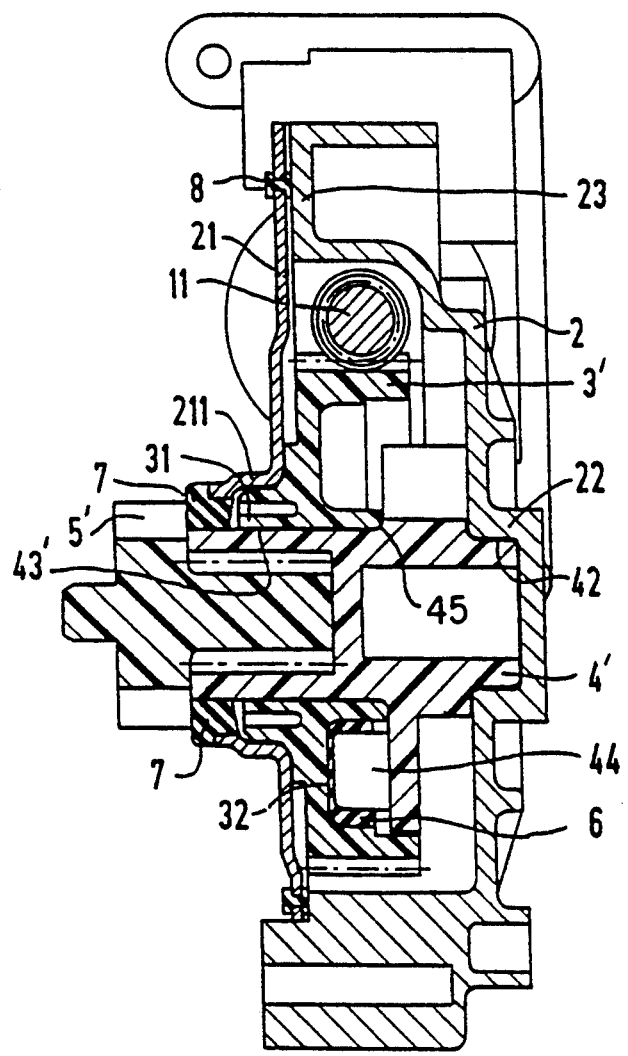
FIG. 3 illustrates an alternate embodiment of FIG. 2.

FIG. 3 shows an alternate driver 4' connected to be driven by the rotation of the gear wheel 3' via a separate damping intermediate layer 6. For this drive connection, axially projecting drive cams 44 of the driver 4 engage corresponding drive pockets 32 provided over the circumference of the gear wheel 3'. The damping element 6, particularly in the form of a rubber disk, is laid between the drive cams 44 and the drive pockets 32. The driver 4' is directly rotatably mounted within the corresponding bearing holder 22 of the gear housing 2 with a first bearing region 42 at one side, and indirectly mounted rotatably with a second bearing region 43, via a bearing sleeve 31 axially molded onto the gear wheel 3' on its other side. Here, the pinion 5' provided as a power take-off element formed separately from the driver 4'. The pinion is inserted from the other side into a holder opening of the driver 4' such that a positive rotational lock is formed with the driver 4?. To axially secure the position of the driver 4', the gear wheel 3' rests against a step 45 of the driver 4' on the other side and on the gear housing lid 21 on the one side.

To afford a moisture-tight seal between the gear housing 2 and the gear housing lid 21. only a first, radially inside first sealing edge 7 functioning as a dynamic seal in the region of the center opening of the gear housing lid 21, as well as a radially outside, second sealing edge 8 functioning as a static seal in the seal region 23 of the reciprocal contact of the gear housing 2 and the gear housing lid 21 are needed (see FIG. 4). Both sealing edges 7 and 8 are scorched (i.e., pre-vulcanized) onto the gear housing lid 21 and are additionally anchored by penetration into perforations arranged over the circumference of the gear housing lid 21 in the region of the sealing edges 7 and 8 as is clearly illustrated in the enlarged representation pursuant to FIG. 6.

As shown in FIGS. 5 and 6, the first sealing edge 7 presses against the driver 4 with sealing lips 71 and 72. These sealing lips are preferably arranged in an opposite spread position. The second sealing edge 8 has sealing lips 81 and 82 are pressed against the gear housing 2 by the gear housing lid 21 when it is closed.

What is claimed is:

1. An adjustment drive comprising:
   a gear housing;
   a gear housing lid, said gear housing lid adapted to close off said gear housing;
   a gear wheel, said gear wheel being rotatably accommodated in said gear housing, and including a concentric bearing sleeve;
   a driver, said driver including a power take-off element on its output side, being simultaneously structured as a drive shaft, and forming a drive connection between said gear wheel and said power take-off element; and
   a damping element, said damping element being at least tangentially elastic, and being provided between said gear wheel and said driver thereby providing tangential stop damping,
   wherein said gear wheel and said driver are formed as separate components and placed in reciprocal rotational drive, and
   wherein said driver is rotatably mounted directly in said gear housing with a first bearing region, and indirectly in said gear housing lid via said concentric bearing sleeve of the gear wheel with a second bearing region.

2. The adjustment drive of claim 1, wherein said driver includes a step, and
   wherein said gear wheel is axially secured on its gear housing side by resting against said step of said driver, and on its gear housing lid side by resting against the gear housing lid.

3. The adjustment drive of claim 1 wherein said power take-off element is a one-piece component of said driver.

4. The adjustment drive of claim 1 wherein said driver consists of a material which functions well as a bearing.

5. The adjustment drive of claim 4 wherein said driver consists of polyoxymethylene.

6. The adjustment drive of claim 4 wherein said driver consists of polyacetal.

7. The adjustment drive of claim 4 wherein said driver consists of a POM plastic.

8. The adjustment drive of claim 1 wherein said gear housing lid has a bearing region which extends axially outward, in the region of a radial inner center opening in said gear housing lid, which holds the indirect bearing region of the driver, and holding a first sealing edge on the circumference which seals the gear housing lid with regard to the driver, and
   wherein said gear housing includes a seal region holding a second discrete sealing edge in the region of its radial outside contact with the gear housing, thereby forming a seal between the gear housing and the gear housing lid.

9. The adjustment drive of claim 8 wherein said first and second sealing edges are anchored in or on the gear housing lid with a positive lock.

10. The adjustment drive of claim 8 wherein said first and second sealing edge are glued onto said gear housing lid.

11. The adjustment drive of claim 8 wherein said first and second sealing edge are injection molded onto said gear housing lid.

12. The adjustment drive of claim 1 wherein said gear housing lid has a bearing region which extends axially outward, in the region of a radial inner center opening in said gear housing lid, which holds the direct bearing region of the driver, and holding a first sealing edge on the circumference which seals the gear housing lid with regard to the driver, and
   wherein said gear housing lid includes a seal region holding a second discrete sealing edge in the region of its radial outside contact with the gear housing, thereby forming a seal between the gear housing and the gear housing lid.

13. The adjustment drive of claim 12 wherein said first and second sealing edges are anchored in or on the gear housing lid with a positive lock.

14. The adjustment drive of claim 12 wherein said first and second sealing edge are glued onto said gear housing lid.

15. The adjustment drive of claim 12 wherein said first and second sealing edge are injection molded onto said gear housing lid.

16. The adjustment drive of claim 1 wherein said power take-off element is a pinion.

17. An adjustment drive comprising:
a gear housing;
a gear housing lid, said gear housing lid being adapted to close off said gear housing;
a gear wheel rotatably accommodated in said gear housing;
a driver, said driver being structured as a drive shaft, including a power take-off element at its output side, and forming a drive connection between said power take-off element and said gear wheel; and
spring web type spokes connecting, in one piece, said gear wheel and said driver, wherein said gear wheel and said driver are placed in reciprocal rotational drive with tangential stop damping,
wherein said driver is rotatably mounted directed in said gear housing with a first bearing region, and directly in the gear housing lid with a second bearing region.

18. The adjustment drive of claim 17 wherein said power take-off element is a one-piece component of said driver.

19. The adjustment drive of claim 17 wherein said driver consists of a material which functions well as a bearing.

20. The adjustment drive of claim 19 wherein said driver consists of a POM plastic.

21. The adjustment drive of claim 19 wherein said driver consists of polyoxymethylene.

22. The adjustment drive of claim 19 wherein said driver consists of polyacetal.

23. The adjustment drive of claim 17 wherein said power take-off element is a pinion.

24. The adjustment drive of claim 17 further comprising a damping element, said damping element being at least tangentially elastic, and being provided between said gear wheel and said driver.

25. An adjustment drive powered by a worm shaft of a commutator motor comprising:
a gear housing;
a gear housing lid, said gear housing lid closing off said gear housing;
a gear wheel adapted to be powered by said worm shaft;
a driver, said driver
having a first bearing region being directly rotatably mounted in said gear housing,
having a second bearing region being directly rotatably mounted in said gear housing lid, and
having a power take-off element;
at least one spoke, said at least one spoke radially extending from said driver to said gear wheel; and
a dynamic seal, said dynamic seal being disposed between a part of said gear housing lid and a third region of said driver.

26. An adjustment drive powered by a worm shaft of a commutator motor comprising:
a gear housing;
a gear housing lid, said gear housing lid closing off said gear housing;
a gear wheel, said gear wheel
adapted to be powered by said worm shaft,
including at least one drive pocket, and
including a bearing sleeve;
a damping element, said damping element being accommodated in said at least one drive pocket;
a driver, said driver
having a first bearing region being directly rotatably mounted in said gear housing,
having a second bearing region being indirectly rotatably mounted in said gear housing lid via said bearing sleeve of said gear wheel,
having at least one drive cam, said at least one drive cam being adapted to fit into said drive pocket;
a dynamic seal, said dynamic seal being provided between said gear housing lid and said driver; and
a static seal, said static seal being provided between said gear housing lid and said gear housing.

* * * * *